United States Patent [19]

Chang et al.

[11] Patent Number: 4,595,507
[45] Date of Patent: Jun. 17, 1986

[54] MEMBRANE SEPARATION OF HYDROCARBONS

[75] Inventors: Y. Alice Chang, Des Plaines; Sudhir S. Kulkarni, Hoffman Estates; Edward W. Funk, Highland Park, all of Ill.

[73] Assignee: UOP Inc., Des Plaines, Ill.

[21] Appl. No.: 637,639

[22] Filed: Aug. 3, 1984

[51] Int. Cl.$^4$ .............................................. B01D 13/00
[52] U.S. Cl. ..................................... 210/638; 210/651
[58] Field of Search ........................ 208/31, 308, 321; 210/640, 651, 500.2, 638; 585/818, 819

[56] References Cited

U.S. PATENT DOCUMENTS

| | | | |
|---|---|---|---|
| 3,750,735 | 8/1973 | Chiang et al. | 210/640 X |
| 4,368,112 | 1/1983 | Thompson et al. | 208/31 |
| 4,413,074 | 11/1983 | Wrasidlo et al. | 210/490 X |

Primary Examiner—Frank Spear
Attorney, Agent, or Firm—Thomas K. McBride; John F. Spears, Jr.; Raymond H. Nelson

[57] ABSTRACT

Mixtures of heavy oils and light hydrocarbons may be separated by passing the mixture through a polymeric membrane. The membrane which is utilized to effect the separation comprises a polymer which is capable of maintaining its integrity in the presence of hydrocarbon compounds and which has been modified by being subjected to the action of a sulfonating agent. Sulfonating agents which may be employed will include fuming sulfuric acid, chlorosulfonic acid, sulfur trioxide, etc., the surface or bulk modified polymer will contain a degree of sulfonation ranging from about 15 to about 50%. The separation process is effected at temperatures ranging from about ambient to about 100° C. and pressures ranging from about 50 to about 1000 psig.

6 Claims, No Drawings

MEMBRANE SEPARATION OF HYDROCARBONS

The Government of the United States of America has rights in this invention pursuant to Contract No. DE-AC07-821D12422 awarded by the U.S. Department of Energy.

BACKGROUND OF THE INVENTION

The conventional methods of separating various hydrocarbons involves technology which includes extraction, absorption, distillation, etc. techniques. However, a disadvantage of utilizing these techniques involves the use of energy which, in the present time, is relatively expensive. For example, in one aspect of petroleum refining a particular application step involves the deasphalting of a heavy crude oil which is recovered from a petroleum source such as a well. The crude oil is generally first passed to an atmospheric pipe still to produce light gases as well as a variety of distillation cuts suitable for use in the synthesis of fuels such as gasoline, etc. as well as cuts which may be useful in the petrochemical industry. The bottoms or bottom fraction from this atmospheric distillation still may then be passed to a vacuum distillation still which will recover lighter products as volatile material which can then be utilized to prepare other fuels such as diesel oil. However, as the feedstocks become heavier in nature, a significant amount of the fuel oil is not volatilized in either the atmospheric or vacuum stills.

In order to recover still useable oil fractions, the heavy bottoms from the vacuum distillation still is then subjected to the action of a solvent which comprises a relatively light hydrocarbon such as a paraffinic hydrocarbon containing from 3 to 7 carbon atoms. In order to obtain the desired fractionation of useable products, a high ratio of solvent to oil is required. For example, in the case of asphaltenes which are precipitated out of the heavy fraction, a typical process will operate with a solvent to oil weight ratio of 4:1 to 10:1 depending upon the degree of oil-asphaltene separation desired. The desired oil fraction, after separation from the precipitated asphaltenes will be recovered while, due to the expense of the solvent required for the separation, it is necessary to recover the solvent for further use. The high ratio of solvent to oil usually requires energy intensive processes due to the need for recovering the solvent by volatilization.

In view of the expense associated with the volatilization processes, it is deemed necessary to provide a relatively low-cost method for recovering the solvent by separation from the oil in order to reuse the solvent in further oil recovery steps. It has now been discovered that a method for separating relatively light hydrocarbons such as those employed as solvents from relatively heavy oil may be accomplished by passing the mixture of heavy oil and solvent through a membrane of the type hereinafter set forth in greater detail whereby an effective separation of solvent from heavy oil may be effected, thus permitting the recovery and reuse of the desirable solvent in further extraction processes.

BRIEF SUMMARY OF THE INVENTION

This invention relates to a process for the separation of heavy oils from light hydrocarbons. More specifically, the invention is concerned with a process for separating a heavy oil from a light hydrocarbon utilizing, as a means of separation therefor, a membrane.

As was hereinbefore set forth, it has now been discovered that certain types of membranes may be employed as separation means whereby a heavy oil may be separated from a light hydrocarbon by passing a mixture thereof through a particular type of membrane. The separation process of the present invention may be applied in a wide variety of areas including the processing of heavy oil such as deasphalting, solvent extraction of lube oils, the treatment of solvent/oil mixtures from emulsification processing as well as processes involving the extraction of edible oils, that is, vegetable or animal oils which do not contain more than about 0.1% of free fatty acid and which are used for food purposes such as cooking, salad dressing, in the manufacture of oleomargarine or other butter substitutes, etc. Such oils may include soybean oil, corn oil, etc.

In some instances, the heavy oil which forms the retentate may tend to form a relatively thick layer on the surface of the membrane, said gel layer diminishing the flux through the membrane due to the increased resistance to flow. While some gel layer formation may have a beneficial effect on the selectivity regarding the separation of light hydrocarbons, the converse of this benefit is the decrease in flux. One method of controlling the decline in flux due to the formation of the gel may be periodical disruptions of the flow of feedstock by pulsed changes in pressure or temperature. Another method of controlling gel layer formation is by the periodical cleansing of the membrane with a solvent. However, both of these procedures involve a disruption in the continuous process, thereby lengthening the period of time sufficient to accomplish the desired separation.

A particularly desirable method of preventing the formation of a gel layer would be to make the membrane more hydrophilic in nature, thus reducing the interaction with the heavy oil which is hydrophobic in nature, thus minimizing the fouling and permitting the flux through the membrane to remain at a desired high level. It has now been discovered that a membrane which is suitable for the separation of heavy oil and light hydrocarbon from a mixture thereof may be modified in a chemical manner to eliminate the fouling of the membrane due to gel formation. The chemical modification of the membrane which is used for the separation of heavy oil and light hydrocarbons from a mixture thereof may be both surface or bulk modifications. The modification of the membrane by sulfonation thereof will be more explicitly described and shown in the examples which are to be found at the end of this specification.

It is therefore an object of this invention to provide a process for separating heavy oil constituents of a mixture from light hydrocarbon constituents.

A further object of this invention is to provide a process for separating heavy oils from light hydrocarbons utilizing a membrane which has been pretreated prior to use thereof whereby formation or fouling of said membrane will be prevented.

In one aspect, an embodiment of this invention resides in a process for the separation of a heavy oil and a light hydrocarbon from a mixture thereof which comprises passing said mixture through a membrane comprising a polymer which maintains its integrity in the presence of hydrocarbon compounds, which has been subjected to a surface or bulk modification pretreatment prior to use thereof, at separation conditions whereby said light hydrocarbon is recovered as the permeate and said heavy oil is recovered as the retentate.

A specific embodiment of this invention is found in a process for the separation of crude oil and hexane from a mixture thereof which comprises passing said mixture through a membrane comprising polysulfone which has been subjected to treatment with fuming sulfuric acid at a temperature in the range of from 10° to about 75° C. and a pressure in the range of from about atmospheric to about 50 atmospheres for a period of time ranging from about 0.5 minutes to about 12 hours, said separation being effected at a temperature ranging from about ambient to about 100° C. and a pressure in the range of from about 50 to about 1000 psig, whereby said crude oil is recovered as the retentate and said hexane is recovered as the permeate.

Other objects and embodiments will be found in the following further detailed description of the invention.

DETAILED DESCRIPTION OF THE INVENTION

As hereinbefore set forth, the present invention is concerned with a process for the separation of heavy oils and light hydrocarbons utilizing, as separation means, a membrane which has been pretreated prior to use thereof by a sulfonation process. By subjecting the membrane to a sulfonation process, it is possible to minimize or eliminate the formation of a gel layer on the surface of the membrane, the aforesaid gel layer contributing to a decrease in the flux rate of the membrane. The modification of the membrane by a sulfonation process can affect either the surface of the membrane or the bulk of the membrane, thus reducing the interaction between the hydrophobic feedstock and the hydrophilic membrane.

As was previously discussed, the means of separation will be particularly applicable in the process such as the treating of emulsions whereby heavy emulsions are broken by means of a solvent, in food processing whereby edible oils are extracted utilizing a solvent as the extracting agent, in the preparation of synthetic fuels as exemplified by the dilution of shale oil with a solvent whereby insoluble particles may be recovered by filtration, in coal or liquefaction in which a solvent is utilized to facilitate the filtration of insoluble particles or in the treatment of wood chips utilizing a solvent such as ethanol to dissolve the cellulosic material. It is to be understood that these various processes are merely given as examples of separation steps in which a membrane may be employed as the separation means.

The separation of heavy oils from relatively light hydrocarbons which have been used as solvents in the various processes is effected by passing a mixture of heavy oils and light hydrocarbons over a membrane whereby a separation is effected and the light hydrocarbons are recovered as the permeate while the heavy oils are recovered as the retentate. The membrane which is employed to effect the desired separation will comprise an organic polymer which will maintain its integrity in the presence of hydrocarbon compounds at the particular separation conditions which are utilized to effect the desired separation. The particular organic polymer which is used should possess certain desirable characteristics with regard to stability under process conditions. For example, the polymeric material should undergo no volume change while maintained at a temperature of 50° C. for an extended period of use which may range up to a time of one year or more; a chemical stability as evidenced by the polymer undergoing no dissolution swelling or plasticizing when subjected to the action of a solvent at a temperature of about 50° C.; a mechanical stability as evidenced by maintaining its physical integrity and not undergoing any compaction when placed under a pressure of 300 psig and, in addition, may also possess the ability or capability of easily changing porosity. In addition, the membranes may also possess a wide range of pore sizes, said pore sizes ranging from about 10 to about 500 Angstroms. The membranes which are used should also be fabricated from polymers which possess a different solubility factor than is possessed by the light hydrocarbons which are separated from the heavy oils. For example, typical hydrocarbons which are employed as solvents will have solubility parameters in the range of from about 6 to about 8 $[cal/cm^3]^{\frac{1}{2}}$. In order to avoid the possibility of having the membrane dissolved in the solvent, it is necessary that the membrane possess solubility parameters sufficiently different from those which are possessed by the hydrocarbon solvents. In the preferred embodiment of the invention, the polymers which are employed to form the membranes will possess solubility parameters in excess of about 9.0. Some representative examples of polymers which may be formed into the membranes which are useful as separation means for the process of the present invention will include thermoplastic polymers in which the solubility parameter is designated as $\delta$ $[cal/cm^3]^{\frac{1}{2}}$ such as polysulfone, 10.6; polycarbonate, 9.6; cellulose acetate, 11.0; polyacrylonitrile, 12.4; polyvinyl alcohol, 12.6; Nylon 6,6, 13.6; Nylon 8, 12 to 14; cellulose, 15.6; polybenzoimidazole, about 11.3; polyamide, 8 to 10; polyimide, about 10 to 12; polytetrafluoroethylene (Teflon), 6.2; etc. It is to be understood that the aforementioned polymers are only representative of the type of compounds which may be employed to prepare a membrane suitable for use in the present process, and that the invention is not necessarily limited thereto.

In addition to the aforementioned characteristics of the polymers which form the desired membrane, it is also essential that a suitable flux is maintained when subjecting the heavy oils and light hydrocarbons to the aforesaid separation process. In order to maintain this flux, the pores of the membrane which, as hereinbefore set forth, range from about 10 to about 500 Angstroms, must not be clogged or made smaller by extraneous material which forms on the surface of the membrane, the original pore size needing to be maintained in its original size in order to afford a decrease in the flux rate of the system.

In order to reduce the formation of the fouling material such as a gel layer, it has been found necessary to increase the hydrophilic properties of the membrane. It has now been discovered that by subjecting the polymer to a pretreatment involving the sulfonation of the polymer or membrane, it is possible to achieve this end. The sulfonation of the polymeric material may take place either prior or subsequent to the casting of the polymer into membrane form. When subjecting the polymer to a sulfonation step prior to casting into membrane form, the bulk of the resultant membrane will be modified, while when subjecting the polymer to sulfonation subsequent to casting as a membrane, the surface of the membrane will be modified.

The membranes which are used for the separation of heavy oils such as crude oils, shale oils, coal liquefaction oils, cellulose, soybean oil, corn oil, etc. from light hydrocarbons which may be employed as solvents such as ethanol, propanol, butanol, n-pentane, n-hexane, n-heptane, n-decane, benzene, toluene, the xylenes, etc. are prepared by dissolving the aforementioned polymer in a suitable solvent. When treating the polymer to modify the bulk of the polymer, the thus dissolved polymer is then admixed with a sulfonation agent such as chlorosulfonic acid which is also dissolved in the same solvent. After admixing the sulfonating agent and polymer for a predetermined period of time which may range from about 0.5 to about 4 hours or more at a temperature ranging from about 5° to about 25° C., the solution may be neutralized by the addition of an alkaline material such as a solution of sodium hydroxide, potassium hydroxide, lithium hydroxide, ammonium hydroxide, sodium carbonate, potassium carbonate, etc., and the bulk-modified polymer which has been sulfonated to such an extent that the degree of sulfonation ranges from about 15% to about 50% is recovered and treated in a manner hereinafter set forth in greater detail to provide the desired membrane.

Examples of solvents which are employed to form the desired casting solution will include N-methyl-2-pyrollidone, dimethyl formamide, dimethyl sulfoxide, dichloromethane, dichloroethane, chloroform, methyl cellusolve, propylene glycol, or mixtures of the aforesaid solvents such as methyl formamide/methyl cellusolve, N-methyl-2-pyrollidone/propylene glycol, N-methyl-2-pyrollidone/dimethyl sulfoxide, etc. It is to be understood that the aforementioned solvents are only representative of the class of compounds which may be employed to form a casting solution and that any suitable solvent which possesses the ability to dissolve the polymeric compound which is to be formed into a membrane may be employed.

In the event that it is desired to modify only the surface of an existing membrane without changing the morphology of the membrane, a polymeric compound is dissolved in a suitable solvent or mixture of solvents in an amount sufficient to form a polymer concentration in the range of from about 10% to about 30% by weight of the casting solution, the preferred concentration being in a range of from about 17% to about 20%. The casting solution is then poured onto a casting surface which may comprise any suitable material possessing the necessary smooth surface such as a glass plate, a metal plate, a polymeric backing, etc. The solution may be cast at a constant rate which may be in the range of from about 5 to about 30 feet per minute and is passed underneath a casting knife which has been set at a predetermined space or interval from the casting surface in order to permit the obtention of a membrane at a predetermined thickness. For example, the thickness of the membrane which is in a relatively thin film may be within a range of from about 5 to about 15 mil and preferably in a range of from about 10 to about 12 mil.

If so desired, a time interval of from about 1 second to about 5 minutes may elapse to allow for solvent evaporation. However, if so desired, the polymeric film on the casting surface may be immediately immersed in a water solution to provide for the coagulation of the polymer and the formation of the membrane film. The temperature of the water bath may be in a relatively wide range of from about 0° to about 50° C., the preferred temperature being less than about 10° C. in order to facilitate the coagulation of the polymer into the membrane film. After allowing the polymer to form and set for a predetermined period of time which may range from 10 seconds to about 1 hour, the coagulation time being dependent upon various factors including temperature, type of polymer, etc., the membrane is recovered for use in the separation of heavy oils from light hydrocarbons.

It is also contemplated within the scope of this invention that additional processing steps for treatment of the membrane prior to its use as a separation means may be effected. However, these steps as herein described are optional in nature and are not essential to the formation of the desired membranes. If so desired, the membrane which has formed in the water bath and has been recovered may be placed in a 50% aqueous ethanol solution for a period of time ranging from about 1 minute to about 1 hour, following which the membrane is annealed by being placed in a hot water bath in which the temperature is maintained in a range of from about 80° to about 100° C. After being heat-treated for a period of time which may range from about 0.5 to about 10 minutes, the treated membrane is recovered and dried at a temperature ranging from about ambient up to about 60° C.

It is also contemplated within the scope of this invention that the formed membranes may then be subjected to a solvent pretreatment prior to use thereof in a separation system. The membranes may be treated with solvents possessing varying polarity whereby the membrane flux and selectivity can be tailored to fit a specific or desired objective. For example, the membranes may be soaked in solvents of increasing polarity by treating said membrane with a water solution for a period of time ranging from about 0.5 to about 2 hours or more, thereafter removing the membrane from the water solution and placing it in a solution comprising an equal amount of water and isopropanol for a like period of time, thereafter treating the membrane with a 100% solution of isopropanol, thereafter placing the membrane in a 50/50 solution of isopropanol and n-pentane and finally, treating the membrane with a 100% solution of n-pentane for a period of time ranging from about 2 to about 6 hours. If so desired, in the final step of treatment with n-pentane, a superatmospheric pressure ranging from about 50 to about 100 psig may be employed. However, the use of superatmospheric pressures is not essential for the treatment procedure. By subjecting the membrane to such a treatment, the collapse of the pores in the membrane will be prevented and thus contribute to an increase in flux without affecting the selectivity of the separation.

The process of the present invention in which a light hydrocarbon such as a solvent is separated from a heavy oil such as a crude oil may be effected in any suitable manner and may comprise either a batch or continuous type operation. For example, when a batch type operation is employed to effect the separation, the mixture of heavy oil and light hydrocarbon may be placed in an appropriate apparatus such as, for example, a static cell. A membrane of the type hereinbefore set forth in greater detail such as polysulfone which has been modified by exposure to or contact with a sulfonation agent such as fuming sulfuric acid, sulfur trioxide, chlorosulfonic acid, etc. may be positioned on a porous metal support which may constitute the bottom of the cell. The shape of the cell is immaterial for the separation operation and may be in cylindrical, rectangular or square form. The mixture to be separated is then placed in the cell which is sealed and pressurized with a substantially inert gas such as nitrogen, argon, helium, etc.

to the desired operating pressure. The mixture is continuously stirred by mechanical means such as a spin bar in order to maintain a homogeneous mixture of the two components. The pressure which is maintained by continuous application of the gas will force the light hydrocarbons through the membrane to afford the desired separation, said light hydrocarbons being recovered as the permeate while the heavy oil is recovered as the retentate.

It is also contemplated within the scope of this invention that the separation process may be effected in a continuous method of operation. When such a type of operation is employed, a reservoir which contains the mixture of heavy oil and light hydrocarbon which are to be separated will continuously feed the mixture by means of necessary valves and pumps across the surface of a membrane which has been modified by exposure to a sulfonating agent which is positioned in a module. As in the case of the batch type operation, the membrane module is maintained at the proper operating conditions of temperature and pressure by external means as well as gas introduction. In the membrane module the light hydrocarbons will pass through the membrane while the heavy oils will be retained on the upstream side of the membrane and may be recovered as retentate, while the light hydrocarbon which has been separated may be recovered as the permeate. In both the batch type and continuous type operations, due to the modification of the membrane either on the surface thereof or in the bulk thereof, a longer membrane life will be observed due to the inhibition of the formation of a gel layer which, if permitted to form, will foul the membrane and thus reduce the flux.

The following examples are given for the purpose of illustrating the process of the present invention. However, it is to be understood that these examples are merely illustrative in nature and that the present process is not necessarily limited thereto.

EXAMPLE I

In this example, polysulfone was dissolved in a solvent comprising dimethyl formamide and methyl cellusolve at ambient temperature and atmospheric pressure in an amount sufficient to impart 17% by weight of polysulfone in said solution. The polysulfone was cast on a nonwoven polyester backing which had a casting knife set at a thickness of 12 mils. The casting solution was poured onto the plate at a rate of 15 ft. per minute and after a short period of 5 seconds had elapsed, polymer on backing was immersed in an aqueous solution, said solution being maintained at a temperature of about 4° C. by means of an ice bath. The polysulfone coagulated to form a membrane and after allowing the coagulation to proceed for a period of about 5 minutes, the membrane was formed.

Fuming sulfuric acid having a concentration of 9N was placed in a beaker and stirred to generate vapors. The polysulfone membrane was placed on top of the beaker and exposed to the vapors for a period of 10 minutes at ambient temperature. The membrane which had been modified by the sulfonation treatment was quenched in a 1N hydrochloric acid solution to stop the sulfonation reaction and thereafter was rinsed with deionized water three times. The degree of sulfonation of the modified polysulfone membrane was <10%.

The modified membrane was then subjected to a solvent pretreatment prior to use as a separation means by immersing the membrane in a 100% water solution for a period of one hour. Following this, the membrane was immersed in a 50/50 solution of water and isopropanol for one hour, 100% solution of isopropanol for one hour, a 50/50 isopropanol/n-pentane solution for a period of four hours followed by a final treatment of 100% solution of n-pentane for an additional four hours.

The membrane prepared according to the above paragraphs was tested on a continuous flow-through unit. A feed comprising a mixture of hexane and deasphalted Boscan crude oil in a weight ratio of 1:6 of hexane to crude oil was placed in the stirred cell. The separation of the mixture was effected by subjecting the feed to a pressure of 220 psig of nitrogen while maintaining a temperature of 50° C.

Samples of the permeate were recovered after cooling the permeate sample with a dry ice bath. The flux through the membrane was measured and was found to be in a range of from about 3.6 to 8.4 GSFD with a selectivity of hexane to crude oil in a range of from 1.2 to 1.1.

EXAMPLE II

To illustrate another form of modifying the membrane, 50 grams of polysulfone was dissolved in 600 ml of dichloroethane. Following this, 3 ml of chlorosulfonic acid was diluted with 50 ml of dichloroethane and this solution was slowly added to the polysulfone solution during a period of 30 minutes while maintaining the temperature of the mixture at about 10° C. utilizing an ice bath. The mixture was stirred for a period of 12 hours at ambient temperature and thereafter 50 ml of a 5N sodium hydroxide solution in methanol was added dropwise. A white haze developed followed by precipitation of the polymer. A 50/50 methyl alcohol/water solution was added, the solution was stirred and the alcohol/water solution was decanted. The precipitate was washed three times with deionized water and dried in a vacuum oven at 60° C. for a period of 48 hours. Nuclear magnetic resonance analysis indicated that the degree of sulfonation of the polymer was about 23%.

The bulk modified polysulfone prepared according to the above paragraph was dissolved in a solvent comprising dimethyl formamide and methylene chloride and the casting solution was poured onto a cleaned glass plate at a rate of 10 feet per minute. After allowing a period of two minutes for solvent evaporation, the glass plate was immersed into an aqueous solution which was maintained at a temperature of 5° C. and allowed to coagulate for a period of about one minute.

The polysulfone modified membrane prepared according to the above paragraph was placed in a solution comprising 50/50 methanol and water for a period of two minutes and thereafter transferred to a hot water bath maintained at a temperature of 90° C. After a period of two minutes, the membrane was recovered, washed under running water for a period of eight hours and dried at room temperature.

The polysulfone-modified membrane was utilized in a separation cell in a manner similar to that set forth in Example I above utilizing a similar feed and similar separation conditions. The flux through the membrane was measured and found to be in a range of from 0.4 to 0.5 GSFD with a selectivity of hexane to crude oil in a range of from about 4.0 to 8.4.

EXAMPLE III

To illustrate the advantages of utilizing a membrane which has been either surface modified or bulk modified by subjecting the membrane to a sulfonation process, a series of separation processes were run utilizing various polymeric membranes. The tests were effected in a manner similar to that set forth in the above examples, that is, a feedstock comprising a mixture of hexane and deasphalted Boscan crude oil was pressurized in a stirred Amicon cell for passage through various membranes. The separation was effected at a temperature of 25° C. with the feed being pressurized with nitrogen in a range of from 75 to 150 psig while utilizing a pressure regulator on the permeate side to maintain the pressure at the range of from 25 to 30 psig in order to avoid vaporization of the light solvent. As in the above experiment, samples were taken after cooling the permeate chamber with a dry ice bath. The results of the tests are set forth in the Table below:

TABLE

| Membrane | Flux GSFD | Selectivity Solvent/Crude |
|---|---|---|
| Polyvinyledene fluoride | V. High[1] | 1.0 |
| Polytetrafluoroethylene | High | 1.0 |
| Cellulose Acetate[2] | 0 | — |
| Cellulose Acetate[3] | 0 | — |
| Hydrolyzed Cellulose[4] Acetate | 9.5 | 1.15 |
| UMO5[5] | 0 | — |
| YM2 | 7.9 | 1.0 |
| Polycarbonate | V. High | 1.0 |
| TFC-801 | 0 (200 psi) | — |
| Surface-modified Polysulfone | 3.6–8.4 | 1.2 |
| Bulk-Modified Polysulfone | 0.5 | 4–8 |

[1]PVF had high initial flux but slowly swelled in the hydrocarbon and the flux decreased.
[2]Cellulose Acetate appeared thermodynamically stable. The lack of an observed flux may be due to pore collapse under surface tension forces.
[3]Annealed at 70° C.
[4]Cellulose Acetate annealed at 85° C. was hydrolyzed in NaOH for 4 minutes.
[5]Membrane or backing swelled in hydrocarbon.

It is readily apparent from the above Table that the various membranes other than those of the present invention possess either a desirable flux or a desirable selectivity, but not a combination of the two. In contradistinction to this is the fact that the polysulfone membranes which were either surface or bulk modified by being subjected to a sulfonation process possess both a desirable flux and a desirable selectivity.

EXAMPLE IV

A separation membrane may be prepared by dissolving polyacrylonitrile in a solvent comprising a mixture of dimethyl formamide and methyl cellusolve at ambient temperature and atmospheric pressure. The polyacrylonitrile solution may then be cast on a glass plate and, after allowing for solvent evaporation, the glass plate containing the film may be placed in a water solution which is maintained at a temperature of about 10° C. After coagulation of the membrane, it may be recovered from the glass plate and subjected to the vapors of fuming sulfuric acid for a period of time sufficient to impart a 25% degree of sulfonization to the surface of the membrane.

The resulting membrane may then be utilized in an Amicon cell to separate a mixture of soybean oil and hexane, the separation conditions which may be employed for this process being ambient temperature and a pressure of 75 psig.

In like manner, a membrane may be prepared by admixing a solution of polyamide dissolved in a solvent comprising dichloroethane with a solution of chlorosulfonic acid which has been diluted with the same solvent, the addition of the chlorosulfonic acid solution to the polyamide solution being effected over a relatively long period of time. The solution may be admixed with stirring for a period of about 12 hours and thereafter it may be neutralized by the addition of sodium hydroxide in a methanol solution. The resultant precipitate comprising a sulfonated polyamide may be recovered, dissolved in a solvent comprising a mixture of N-methyl-2-pyrollidone and dimethylsulfoxide and casting in a similar manner to that hereinbefore set forth. The resulting membrane may then be used in an Amicon cell to separate shale oil and hexane.

We claim as our invention:

1. A process for the separation of a deasphalted crude oil and a light hydrocarbon solvent from a mixture thereof comprising passing said mixture across a polysulfone membrane at separation conditions whereby said light hydrocarbon solvent is recovered as the permeate and said deasphalted crude oil is recovered as the retentate, said membrane being prepared by a process wherein said polysulfone polymer is initially contacted in the form of a solution with a sulfonation agent under conditions suitable to achieve a degree of sulfonation of said polysulfone of from about 15 to about 50 percent, with said polysulfone subsequently being solution cast to form said membrane.

2. The process as set forth in claim 1 in which said separation conditions include a temperature in the range of from about ambient to about 100° C. and a pressure in the range of from about 50 to about 1000 pounds per square inch gauge.

3. The process as set forth in claim 1 in which said membrane possesses pore sizes in the range of from about 10 to about 500 Angstroms.

4. The process as set forth in claim 1 in which said treatment conditions include a temperature in the range of from about 10° to about 75° C. and a pressure in the range of from about atmospheric to about 50 atmospheres for a period of time in the range of from about 0.5 minutes to about 12 hours.

5. The process as set forth in claim 1 in which said sulfonating agent comprises chlorosulfonic acid.

6. The process as set forth in claim 1 in which said contact of said polymer is effected by admixing a solution of said polymer dissolved in a solvent and a solution of said sulfonating agent, and thereafter neutralizing the resultant modified polymer.

* * * * *